May 30, 1939. G. S. CARROLL Re. 21,098
PAPER MANUFACTURING
Original Filed Jan. 11, 1936
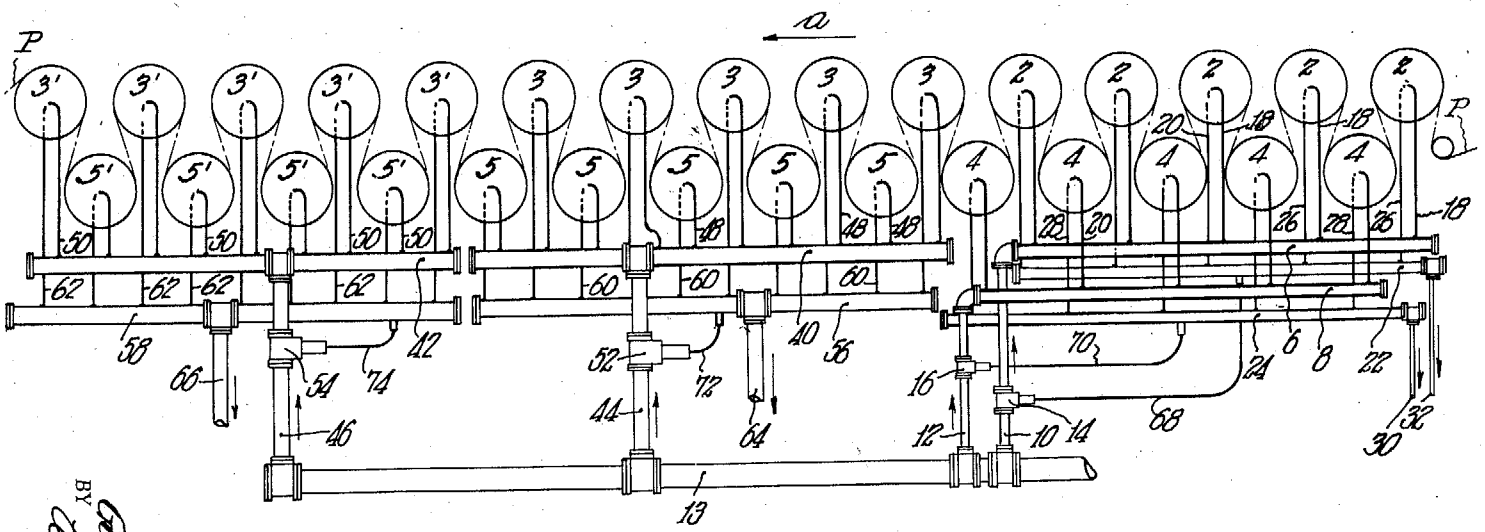
INVENTOR
George S. Carroll.
BY
Walter C. Ross.
ATTORNEY.

Reissued May 30, 1939

Re. 21,098

UNITED STATES PATENT OFFICE 21,098

PAPER MANUFACTURING

George S. Carroll, Bennington, N. H.

Original No. 2,064,647, dated December 15, 1936, Serial No. 58,724, January 11, 1936. Application for reissue July 15, 1938, Serial No. 219,469

7 Claims. (Cl. 34—24)

This invention relates to improvements in paper manufacture and is directed more particularly to improvements in apparatus for and methods of drying paper.

The principal objects of the invention are the provision of methods of drying paper to facilitate the making of paper having both its surfaces more nearly uniform than has heretofore been possible.

The type of dryer with which the invention is illustrated includes a plurality of rotatable spaced hollow drying cylinders, commonly called cans, which are arranged in upper and lower banks or rows. A heating medium such as steam is delivered into the cylinders and the condensate is led therefrom.

The web of paper to be dried is led into the wet end of the machine and it travels over a roll of one bank or row and then over a roll of the other bank or row. That is, the web alternately contacts the rolls of the two banks or rows so that first one of its sides, and then the other, contacts with the rolls.

As is well known, a paper web has a felt side and a wire side. The latter is that side next to the Fourdrinier wire as the paper is formed; the former is the side next to the felt. The wire side of the paper is relatively smooth as compared with the felt side, wherefor there is a difference in the rate of drying between the two sides. That is, the relatively smooth or wire side of the paper contacts more perfectly with the drying cylinders than does the less smooth or felt side with the result that there is a difference in the drying rate which produces paper having unlike surfaces. To overcome this various subsequent operations on the paper are necessary.

In the operations of dryers of the type referred to, it has been the common practice to divide the cylinders into groups or sections and to heat the rolls of the different sections at different temperatures but this does not overcome the difference in the drying rate existing between the felt and wire sides of the paper.

According to this invention, however, the difference in the drying rate is overcome by heating some of the rolls of one bank at one temperature and the adjacent rolls of the other row or bank at a different temperature. Then the paper travels alternately over rolls of a certain temperature and rolls of a different temperature. The temperatures are so controlled, according to the invention, that the side of the paper requiring the most heat contacts with cylinders of a temperature higher than that of the other cylinders with which the other or faster drying side of the paper contacts. This facilitates the producing of paper which is substantially uniform on both sides; that is paper having more uniform characteristics on opposite sides.

Various other novel objects and advantages of the invention will be observed from the following description of the present preferred form thereof, reference being had to the accompanying drawing wherein:

The figure is a small scale diagrammatic elevational view of a drying apparatus embodying certain novel features of the invention.

Now by reference to the drawing more in detail, the invention will be fully described.

The dryer of the type to which the invention relates includes upper and lower banks or rows of cylinders or drums, commonly called cans. The cylinders are hollow and are mounted for rotation so that a web P represented by dot-dash lines is carried alternately over a roll of the upper bank and over a roll of the lower bank and thereby through the machine in the direction of the arrow *a*.

A heating medium such as steam is delivered into the cylinders and the condensate leads from the rolls. Sometimes the steam is delivered into one end of the cylinders while the condensate is taken out at the other end and in other cases the steam and condensate return are at the same end of the cylinder.

Suitable stuffing boxes and connections are provided to facilitate rotation of the cylinders and form no part of the present invention. For clearness, as will appear, the drawing shows the heating medium pipes at one end of the cylinders while the return, or condensate, pipes are at the other.

According to the invention, a small number of the rolls such as 2 of the upper bank at the wet end of the dryer are operated at a different temperature than that of a plurality of adjacent rolls such as 4 of the lower bank.

This is accomplished by the provision of separate headers 6 and 8 to supply the heat to the upper and lower cylinders. The headers 6 and 8 are connected by pipes 10 and 12 to a main supply pipe 13 carrying the heating medium such as steam. Valves 14 and 16 in pipes 10 and 12 control the flow of steam into the headers 6 and 8. The headers 6 and 8 are connected to the cylinders 2 and 4 by pipes 18 and 20.

Other drainage headers 22 and 24 are connected by pipes 26 and 28 to the cylinders and these headers are provided for the condensate.

They are connected, as by pipes 30 and 32, to a drainage system in association with which there may be means such as a vacuum pump to bring about a low pressure condition.

As stated, the valves 10 and 12 control the flow of steam to the cylinders so that the upper rolls may be operated at different temperatures than that of the lower rolls. The temperature of one group of rolls may be relatively greater or less than that of the other group, and either the upper or lower group may carry the relatively higher temperature, depending upon the type of paper being handled, the drying effect necessary or desired, and other variable factors.

As an example, a certain type of paper may enter the dryer so that its relatively smooth wire side contacts with the upper rolls while its lower less-smooth side, which requires relatively more heat, contacts with the lower rolls. Under these conditions the lower rolls may be operated at the desired and necessary higher temperature relative to that of the upper rolls by controlling the flow of steam to headers 6 and 8.

In this way, at the wet end of the dryer where the initial drying of the paper takes place it is possible to provide the difference in temperature of the upper and lower rolls in order to overcome the difficulties and objections inherent when there is a difference in the drying rate of opposite sides of the paper.

Other upper cylinders 3 and 3' and lower cylinders 5 and 5' may be provided. Of course, there may be any desired number of cylinders for supporting and acting on the paper.

The rolls 3 and 5 constitute one group or section and the rolls 3' and 5' constitute another group or section. The rolls may be arranged of course to provide a desired number of sections. Steam supply headers 40 and 42 are connected by pipes 44 and 46 while steam is carried to the cylinders by pipes 48 and 50. Control valves 52 and 54 in pipes 44 and 46 control the flow of steam into the headers.

Return headers 56 and 58 are connected to the cylinders by pipes 60 and 62 and pipes such as 64 and 66 are provided for drainage and may be connected to a vacuum pump or the like.

The valves 14, 16, 52 and 54 may take any form desired but will preferably be such as will control the flow of steam within relatively narrow limits to thereby facilitate the accurate temperature control desired. They may be of the thermostat type arranged to operate on temperature changes.

To that end it has been found desirable that the valves be controlled in their operation by the temperature of the condensate in the headers and this may be accomplished by means of a temperature-sensitive substance operatively associated with the return headers and carried by conduits 68, 70, 72, and 74 which are connected to the control valves. A valve apparatus of the general type disclosed in United States Letters Patent to Lear 1,965,552 and dated July 3, 1934, with the necessary modifications will suffice for this part of the invention.

Thus it will be seen that the paper to be dried is initially led over cylinders of different temperatures in such a way that opposite sides thereof alternately contact with cylinders of different temperature whereby the difference in the drying rate or ability to dry of the opposite sides of the paper is overcome or at least largely obviated.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. The method of drying paper which consists in, contacting opposite sides of a web of paper alternately with the cylinders of upper and lower spaced banks of cylinders, maintaining a certain portion of the cylinders of the lower bank of cylinders at a certain temperature and a portion of the cylinders of the upper bank adjacent to said certain portion of the lower bank with which the web first contacts at a different temperature and maintaining other subsequent cylinders of the banks which are adjacent one another at substantially the same temperature.

2. The method of drying paper which consists in leading a web of paper into the leading in end of a dryer including spaced upper and lower rows of hollow drying cylinders so that said web has its opposite sides contacted alternately with cylinders of the upper and lower rows of cylinders, maintaining a certain number of the cylinders of one row at substantially one certain temperature and adjacent cylinders of the other row at substantially a different temperature, whereby one side of the web contacts cylinders of one temperature and the other side of said web contacts cylinders of a different temperature.

3. The method of drying paper which consists in, leading a web of paper into the leading in end of a dryer including spaced upper and lower rows of hollow drying cylinders so that said web has its opposite sides contacted alternately with cylinders of the upper and lower rows of cylinders, maintaining a certain number of the cylinders of one row at substantially one certain temperature and adjacent cylinders of the other row at substantially a different temperature, whereby one side of the web contacts cylinders of one temperature and the other side of said web contacts cylinders of a different temperature, and in maintaining subsequent cylinders of the upper and lower rows at substantially the same temperature.

4. In the drying of a running matted paper web the opposite sides of which have different heat transfer characteristics, the method of alternately but not simultaneously applying heat to the opposite sides of the running web in such a manner that the quantity of heat supplied to one side of the web during each of a series of applications of heat to that side is less than the quantity of heat supplied to the other side of the said web during the next preceding application of heat to the said other side to produce a sheet which is substantially free of tendency to curl.

5. In the drying of a running matted fibrous web the opposite sides of which have different heat transfer characteristics, the method which comprises supplying heat to both sides of the web to take moisture from both sides thereof and supplying heat to the one side of the said web at a controlled temperature different from the controlled temperature at which heat is supplied to the other side of the said web to produce the desired relative drying of the two sides to obtain a sheet substantially free from tendency to curl.

6. In the drying of a running matted paper web having a smooth side and a rough side, the method of alternately but not simultaneously heating the two sides of the web, and supplying heat to the rough side at a temperature sufficiently greater than that at which heat is supplied to the smooth side to cause the desired drying of the respective sides of the web.

7. In the drying of a running matted paper web having opposite sides having different heat transfer characteristics, the method comprising weaving the running web over successive drying cylinders alternately heating opposite sides of the running web, and maintaining relative temperatures of drying cylinders heating one side of the web higher than the relative temperatures of related drying cylinders heating the other side of the web to dry the respective sides of the web as desired.

GEORGE S. CARROLL.